United States Patent [19]
Olson

[11] 3,770,031
[45] Nov. 6, 1973

[54] ROUTING FIXTURE

[76] Inventor: Eugene T. Olson, 13460 North Highway 65, Route 4, Anoka, Minn.

[22] Filed: Mar. 3, 1972

[21] Appl. No.: 231,497

[52] U.S. Cl. .......... 144/136 R, 83/471.2, 144/134 B
[51] Int. Cl. .............................................. B27c 5/02
[58] Field of Search ...................... 63/613, 821, 824; 144/136 R, 134, 133; 83/471.2, 471.3, 745, 706, 435.1, 922

[56] References Cited
UNITED STATES PATENTS

| | | | |
|---|---|---|---|
| 1,462,234 | 7/1923 | Laughlin | 144/136 R |
| 3,403,709 | 10/1968 | Retherford et al. | 83/471.2 |

Primary Examiner—Andrew R. Juhasz
Assistant Examiner—W. D. Bray
Attorney—Stuart R. Peterson

[57] ABSTRACT

The routing fixture constitutes a table comprised of two flat panels separated by a slot. Tubular rails function as a track for guiding a carriage in a direction parallel to the slot, the carriage supporting a motor-operated router. The carriage includes a handle-actuated platform by which the router, which is attached to the platform, can be moved toward and away from the slot. The insertion or removal of shims permits thicker or thinner stock, as the case may be, to be worked on. Specially designed clamps hold the stock or work in a fixed relationship while the carriage and the router are moved relative thereto; another specially designed clamp holds the carriage fixed when the stock or work is to be moved relative to the carriage. The carriage is mounted for virtually frictionalless movement by reason of certain bearings associated with the supporting of the carriage. Lateral extensions enable relatively large pieces of work to be accommodated on the table or fixture. Various bolts are employed for holding the table together so that it can be easily shipped in a disassembled condition and then assembled by the purchaser.

20 Claims, 12 Drawing Figures

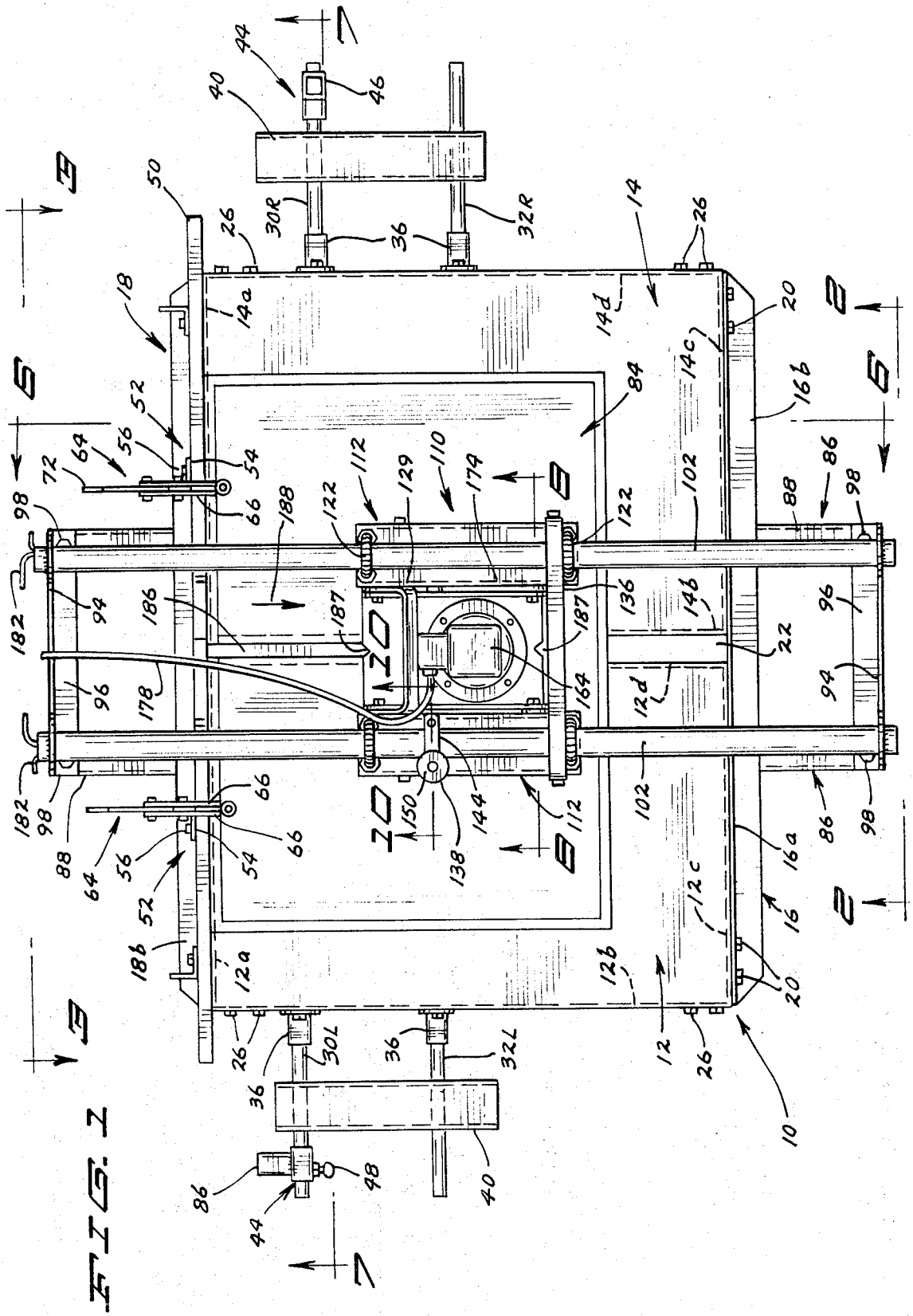

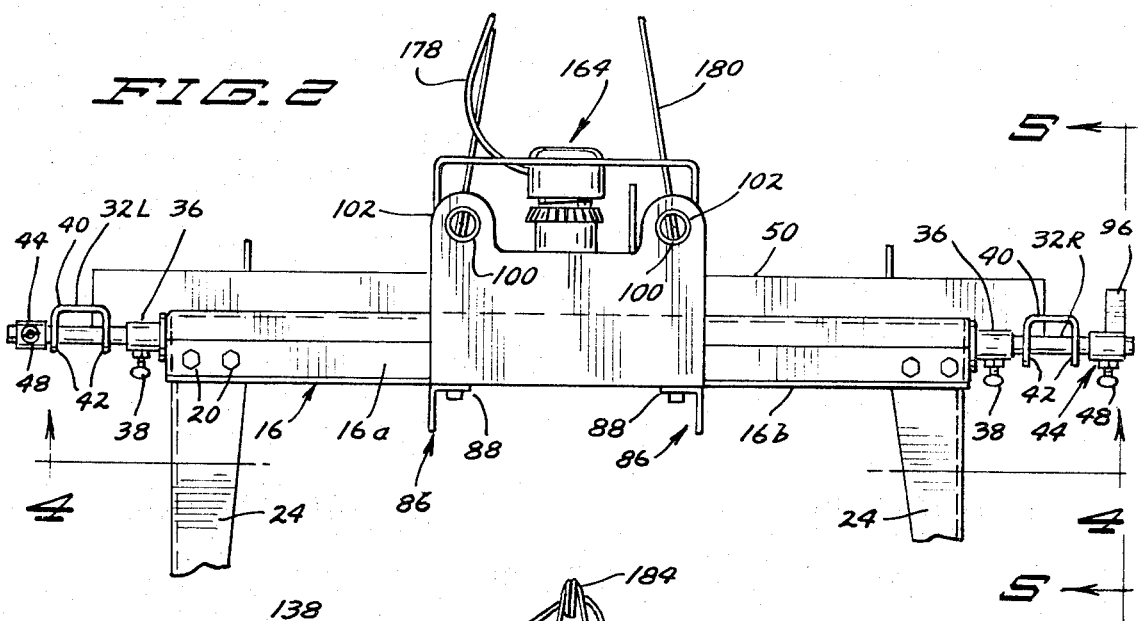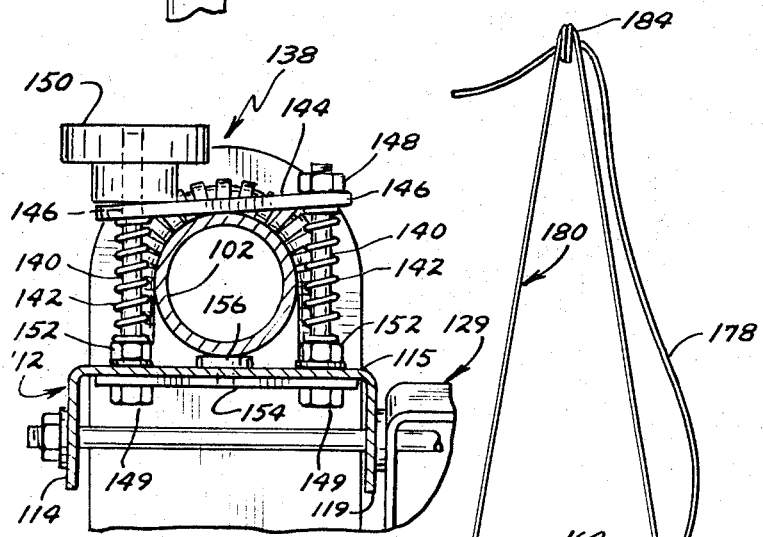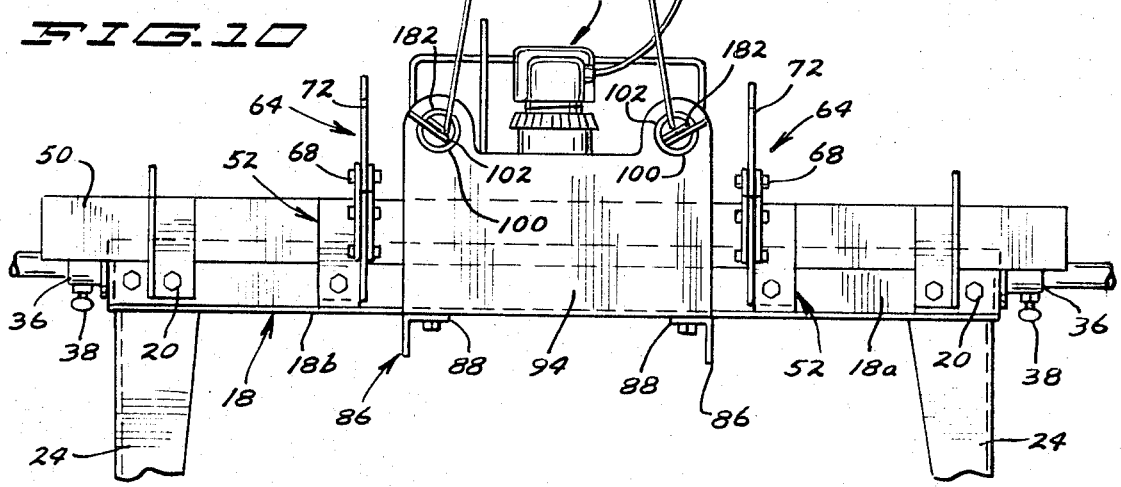

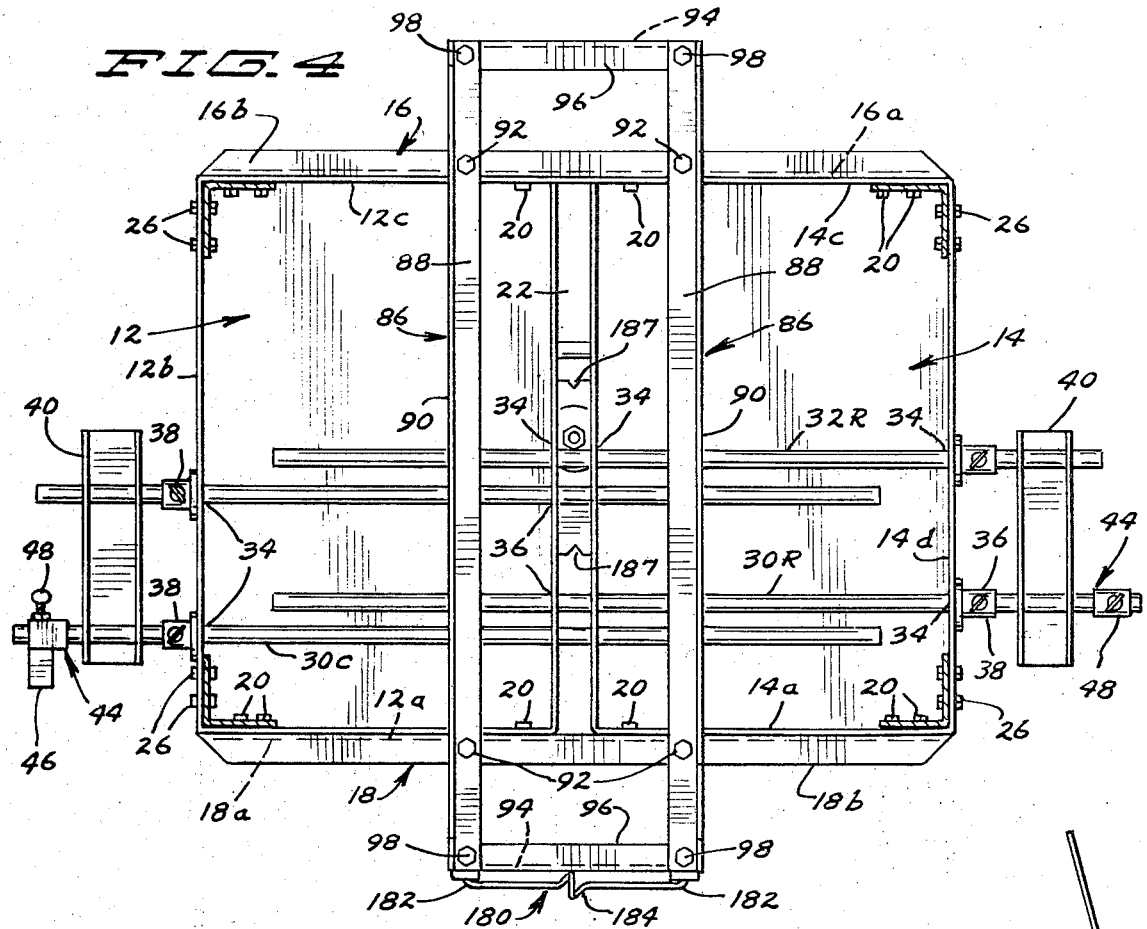
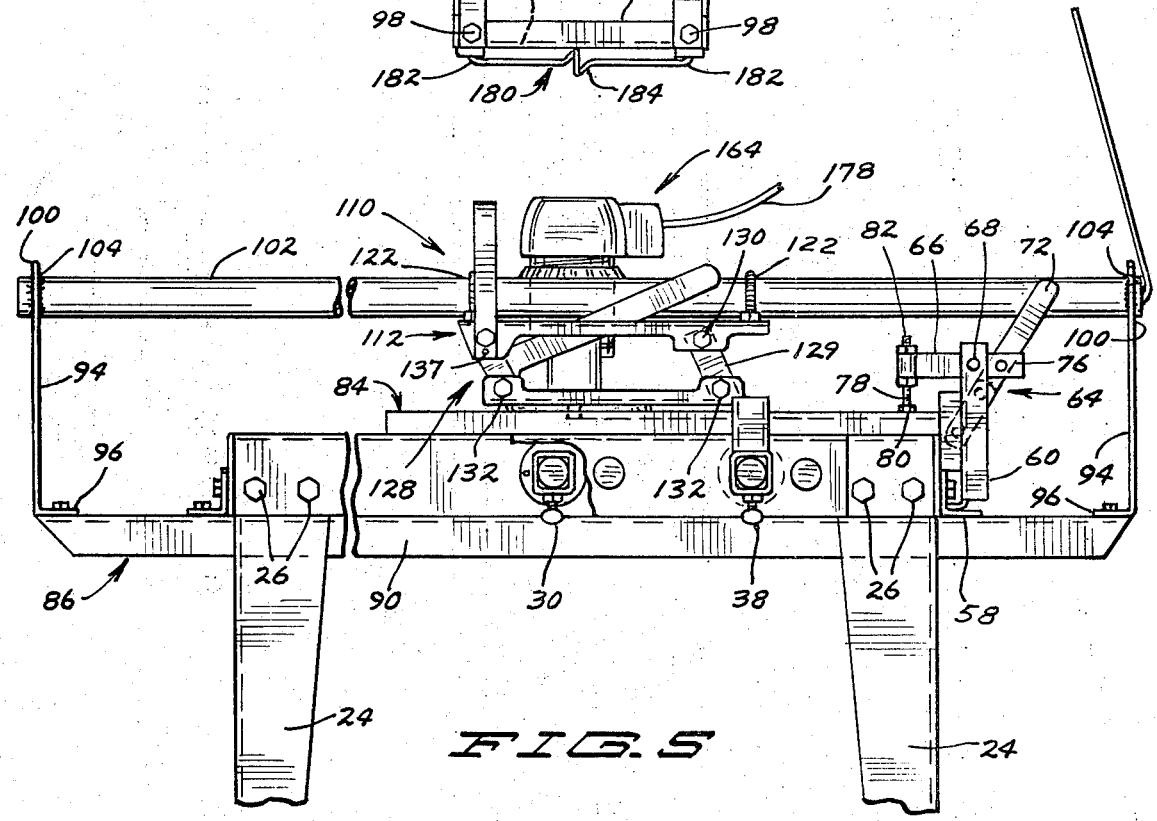

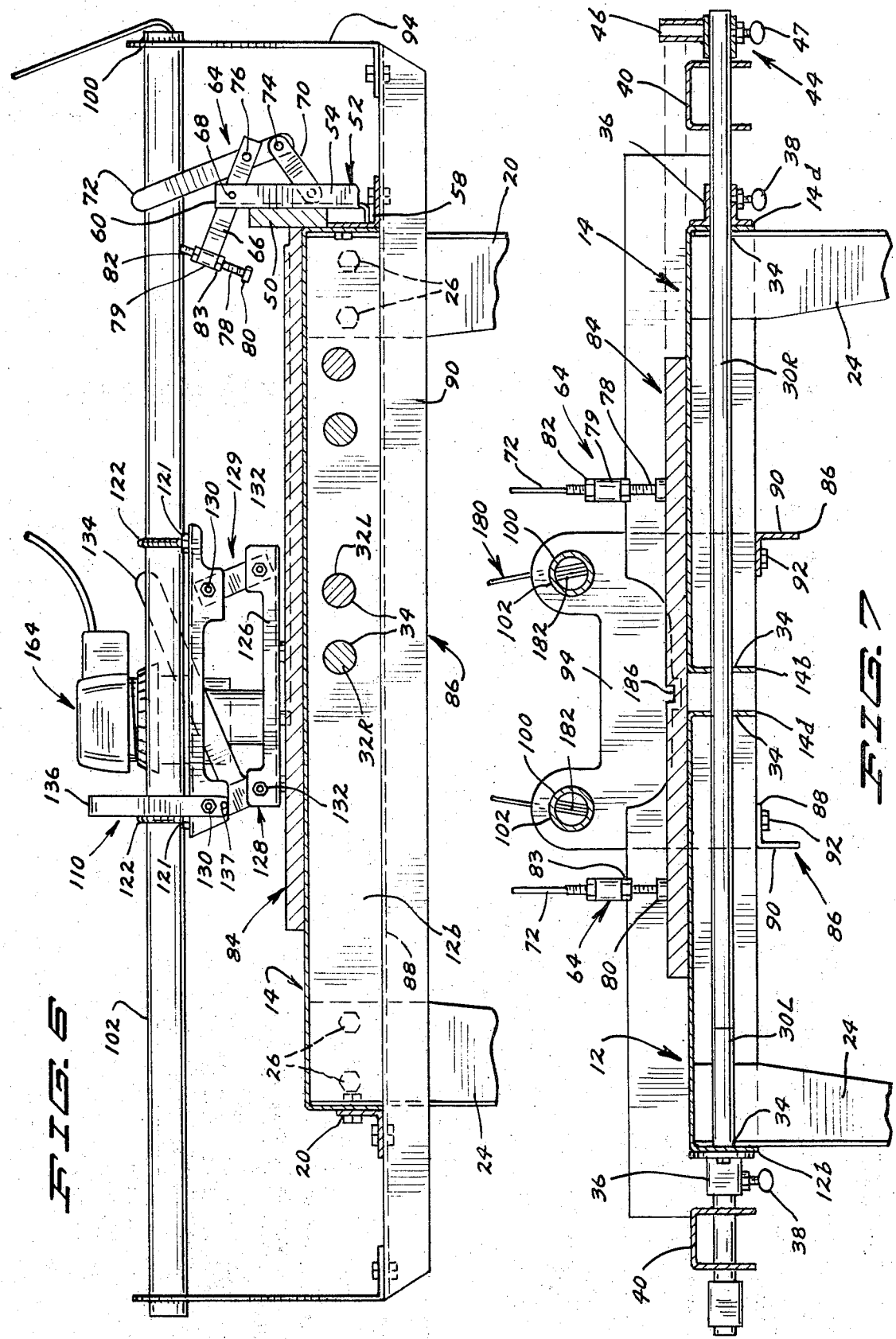

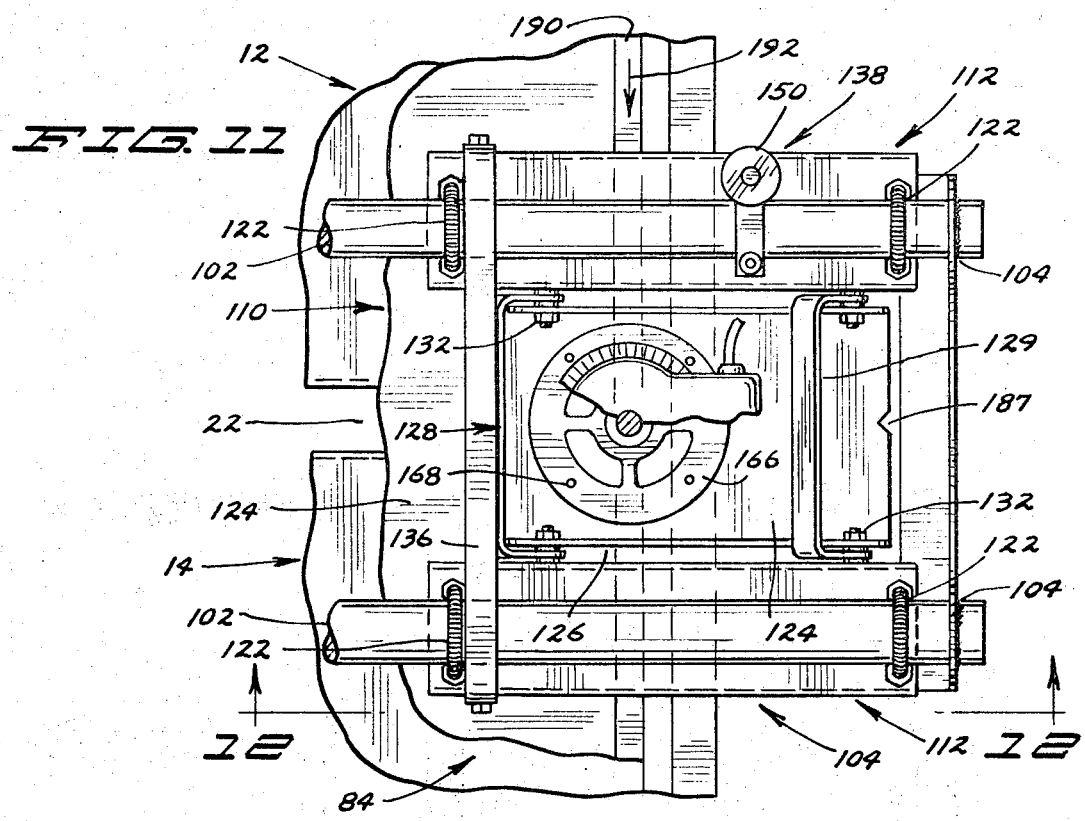
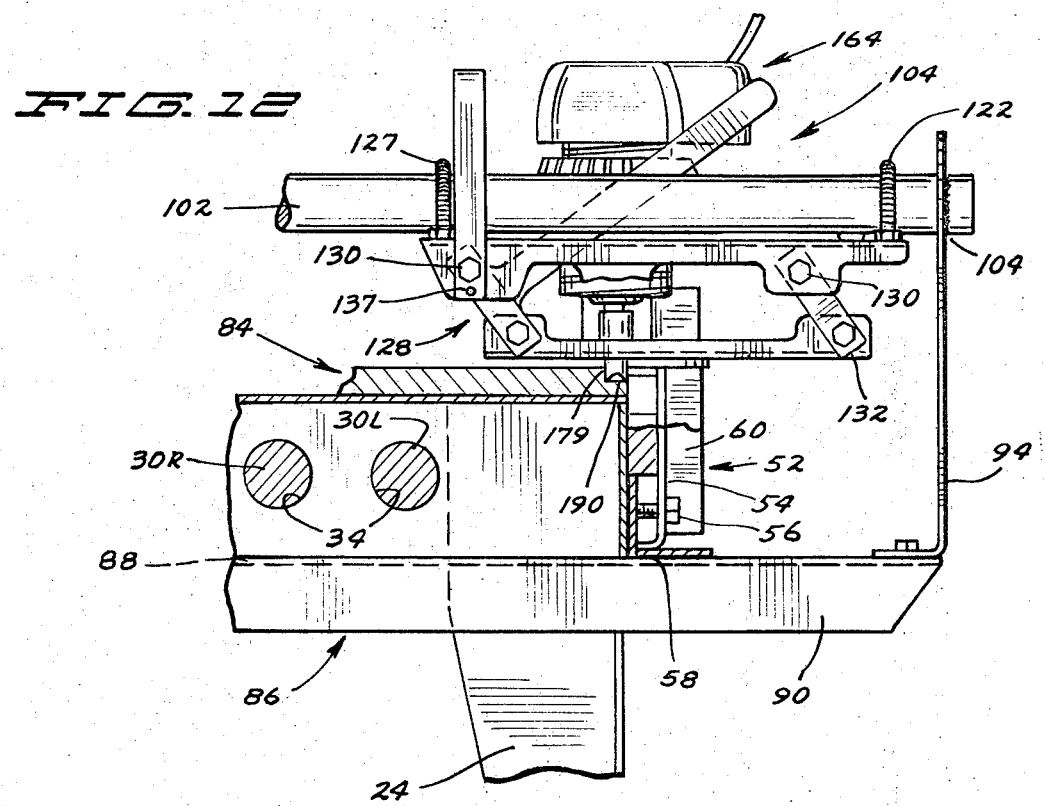

ROUTING FIXTURE

BACKGROUND OF THE INVENTION

1. Field of the Invention

This invention relates generally to routing, and pertains more particularly to a fixture for holding a motor-driven router while performing routing operations.

2. Description of the Prior Art

While various routing machines have been devised, the so-called radial router being one example, these machines have been quite cumbersome and costly to manufacture. For instance, a typical routing machine of the radial character includes a movable head with the cutter depending vertically therefrom, the head being mounted on a set of elaborate hinged arms which move over the workholding table.

Owing to the complexity of machine routers, portable hand routers have been utilized quite extensively. In such instances, the rotating cutter is simply mounted in a head which is moved by hand. Usually, the cutter is positioned by a guide mounted just above the cutter and integral with the head.

SUMMARY OF THE INVENTION

Accordingly, one object of the present invention is to provide a fixture, more specifically a table, that provides the benefits usually derivable only from an expensive routing machine, yet possessing the distinct advantages of simplicity and low cost normally obtained only from a portable hand-held router.

An aim of the invention is to provide means for mounting a conventional hand router so that it can be better manipulated with respect to the work, or conversely the work moved relative to the router. In this regard, the fixture constructed in accordance with the teachings of the present invention enables the user to move the motor-driven router over the work while the work is fixedly clamped in place on the table, or hold the router in place while the work is moved under the router. Therefore, a more specific object of the invention is to provide a routing fixture or table that will permit both cross cuts and rip cuts to be made, the worker simply clamping the stock in place in one instance and clamping the carriage on which the router is mounted in place in the other.

Another object of the invention is to provide a routing fixture, more specifically a table, that will be lightweight and inexpensive to manufacture, yet which will allow the worker to perform all of the usual routing operations.

Another object is to provide a fixture or table which will enable the worker to perform routing operations in a more accurate manner than would be possible when using only a portable hand router. In other words, the fixture provides for guiding the router through a predefined path when desired, or permitting the path to be changed as circumstances require. In other words, when utilizing a fixture constructed in accordance with the present invention it is not necessary, at least when performing certain routing operations, to employ the usual router guide used on handheld routers.

Still another object is to provide a table that will accommodate relatively large or oversize stock. In this regard, it is within the purview of the invention to utilize extensions with guide stops, the extensions being normally located within the confines of the table yet readily extendable when relatively large pieces of work are to be accommodated.

Still another object is to provide a clamping arrangement that will anchor and securely hold work of various sizes irrespective of whether the above-mentioned extensions are being used.

Still further, an object of the invention is to provide a fixture or table of the foregoing character that can be easily assembled and disassembled, thereby facilitating its shipment and storage. More specifically, it is planned that the major parts constituting the table will be held together by bolts and nuts which can be easily removed when the table is to be knocked down, so to speak, for either initial shipment or reshipment after it has been once used. Still further, the disassembly thereof is so simple that the table can be taken apart and stored whenever desired.

Also, a further object of the invention is to provide for the accommodation of relatively thick stock, this being done by the simple expedient of inserting spacing blocks or shims.

Still another object is to provide a routing fixture in which the relatively moving parts are virtually frictionaless.

Also, the invention has for an object the provision of a routing fixture that will be extremely easy to use, requiring little or no special training of the worker to make him proficient.

Briefly, my invention comprises two panels which are retained in a laterally spaced planar relation so that a slot is provided therebetween. Fixedly associated with the slot are two rails constituting a track via which a carriage is constrained for rectilinear movement. It is on the carriage that a conventional motor-driven router is mounted, the carriage including a platform that can be shifted toward and retracted from the slot when performing routing operations. The carriage is clamped in a fixed relationship with the table when the stock or work is to be moved, and provision is made for clamping the stock or work to the table when the carriage and the router mounted thereon are to be moved. The panels are formed with integral flanges and these flanges are provided with aligned holes which accommodate extension rods which are extendable laterally to either side of the table so that supporting feet thereon underlie the overhanging work or stock that is to be routed.

BRIEF DESCRIPTION OF THE DRAWINGS

FIG. 1 is a top plan view of a table exemplifying my routing fixture;

FIG. 2 is a front elevational view of the table taken in the direction of line 2—2 of FIG. 1;

FIG. 3 is a rear elevational view taken in the direction of line 3—3 of FIG. 1;

FIG. 4 is a bottom plan view of the table, the view being taken in the direction of line 4—4 of FIG. 2;

FIG. 5 is a side elevational view of the table, the view being taken in the direction of line 5—5 of FIG. 2;

FIG. 6 is a sectional view taken in the direction of line 6—6 of FIG. 1;

FIG. 7 is a sectional view taken in the direction of line 7—7 of FIG. 1;

FIG. 10 is a sectional view taken in the direction of line 10—10 of FIG. 1 for the purpose of showing the manner in which the carriage is clamped in order to prevent inadvertent movement thereof when performing certain routing operations;

FIG. 11 is a top plan view of the carriage, a portion of the router having been removed in order to expose to view certain portions of the carriage, and the view depicting the carriage at the rear of the table so that a rip cut routing operation can be performed, and FIG. 12 is a sectional view taken through the table in the direction of line 12—12 of FIG. 11, the view illustrating with even greater clarity the type of routing operation being performed along the rear edge of the work.

DESCRIPTION OF THE PREFERRED EMBODIMENT

Figure 8:
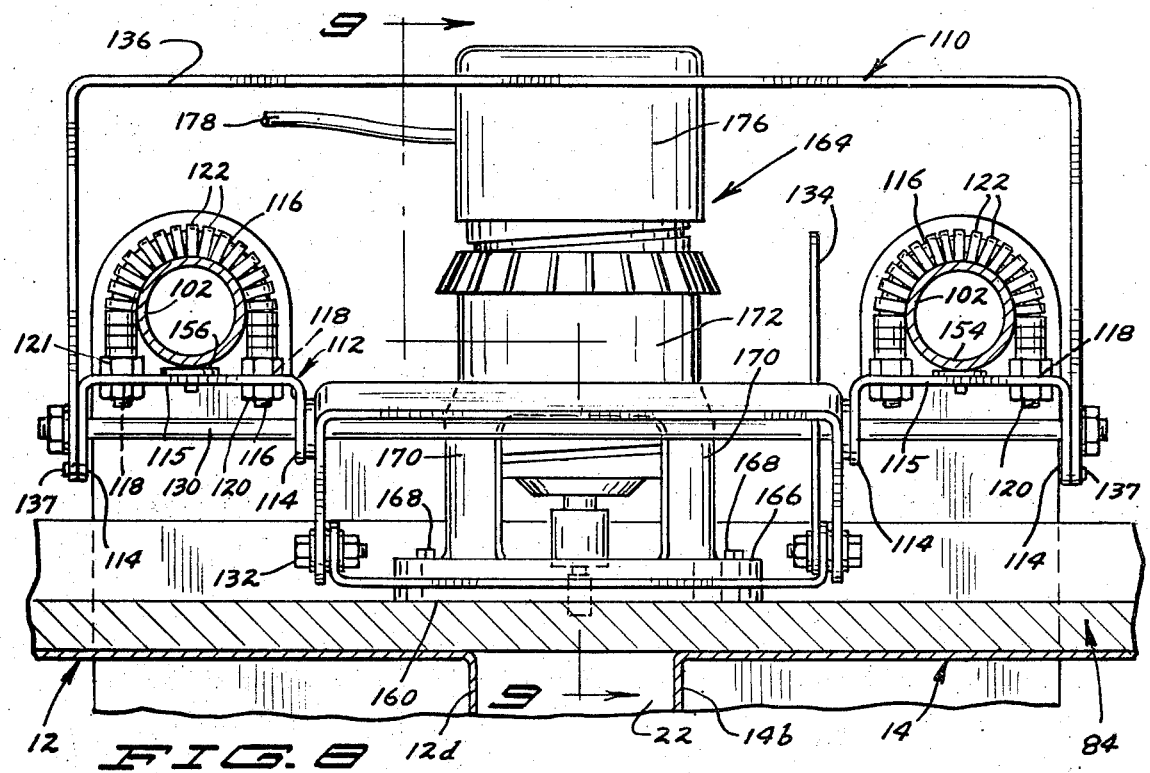
FIG. 8 is a sectional view taken in the direction of line 8—8 of FIG. 1, the view being enlarged and showing to better advantage the construction of the carriage on which the motor-driven router is mounted.

Referring now in detail to the drawings, the fixture selected for exemplifying my invention has been presented in the form of a table denoted generally by the reference numeral 10. The table 10 includes two sheet metal panels 12 and 14, these panels having integral front marginal flanges 12a and 14a, left side marginal flanges 12b and 14b, rear marginal flanges 12c and 14c, and right marginal flanges 12d and 14d. The edges of these various flanges 12a through 14d are all visible in FIG. 4.

Maintaining the panels 12 and 14 in a planar relationship with each other are front and rear angle members 16 and 18, respectively. The front angle member 16 has a vertical flange 16a and a horizontal flange 16b; the rear angle member 18 has a vertical flange 18a and a horizontal flange 18b. As can be discerned from FIGS. 2 and 3, the horizontal flanges 16b and 18b are in the plane of the lower edges of the previously mentioned marginal flanges 12a, 14a, 12b, 14b, 12c, 14c, 12d and 14d. Maintaining the vertical flanges 16a and 18a in a fixed relation with the flanges 12a, 14a and 12c and 14c are bolts 20. In other words, the bolts 20 rigidly connect the angle members 16 and 18 through the agency of their flanges 16a and 18a, respectively, to the two panels 12 and 14, doing so through the flanges that are integral therewith.

It is important to observe that a slot 22 exists between the panels 12 and 14. Thus, the front and rear angles 16 and 18 maintain the panels 12 and 14 in a fixed relationship with each other and also in a spaced relationship so as to provide the slot 22.

Additionally included in the table 10 are four legs 24 which are bolted in place by means of certain of the bolts 20 and additional bolts 26.

As already indicated, the foregoing description has dealt with the basic table. It will be noted, though, that removal of the bolts 20 and 26 permit the table to be disassembled and readily reassembled. This is of considerable importance as far as factory shipment is concerned. However, it is also of advantage as far as storing the table when not needed, for the table can be knocked down and later reassembled when routing operations are to be performed. Consequently, the versatility of the table is thought apparent.

Attention is now directed to a pair of extension rods 30L, 32L and 30R, 32R. It can be observed from FIG. 1 that the rods 30L and 32L are partially extended to the left and similarly the rods 30R and 32R are partially extended to the right. The extension of the rods 30 and 32 is made possible by reason of appropriately aligned holes 34 in the previously mentioned flanges 12b, 14b, 12d and 14d. Reference to FIGS. 6 and 7 will provide a better understanding of the hole arrangement that accommodates the rods 30 and 32 for slidable extended movement.

There are guides 36 attached to the flanges 12b and 14d, and by means of a thumb or set screw 38 associated with each guide 36, the particular extension rods 30L, 32L, 30R and 32R can be held in its extended position. It will also be observed that each pair of extension rods carries adjacent their free ends a channel-shaped extension foot 40. Although these extension feet 40 are shown in FIG. 1, their channel-shaped configuration is best understood from FIG. 2. Also, it will be seen that each channel-shaped extension foot 40 is provided with aligned holes at 42 through which the rods 30 and 32 extend.

At the ends of the rods 30L and 30R are adjustable stops 44, each having a positioning lug 46. Close study of FIGS. 1 and 2 will show that the positioning lug, this being for positioning the work or stock, is directed upwardly as far as the stop 44 isconcerned which is at the right and the lug 46 on the stop 44 at the left is directed horizontally, thereby rendering the particular lug 44 at the left ineffectual as far as positioning the work is concerned. It will further be noted that there is a set screw 48 associated with each stop 44 that enables the proper positioning of the lug 46 and also holds the stop 44 in a fixed position on the particular rod 30L at the left and the corresponding rod 30R at the right. Especially from FIG. 7, it is thought readily apparent that the rods 30 and 32 can be projected or extended to whatever degree is necessary to accommodate oversize pieces of work or stock. More will be said later on concerning the actual type of stock or work to be routed.

Although not really a part of the table 10, nonetheless it is contemplated that a replaceable guide board 50 be employed. The upper edge of this board 50 can be seen in FIG. 1, but FIG. 6 shows the board in cross section and this particular figure additionally better illustrates the presence of brackets 52 composed of a vertical mounting flange 54 confronting the boards 50, bolts 56 attaching the vertical flange 54 on each instance to the rear flanges 12c and 14c. By means of an inturned spacing lip 58 at the lower end of the vertical mounting flange 54, a spaced relationship is maintained between the flange 54 and the flanges 12c and 14c at the rear of the table. This permits the reception and accommodation of the board 50. Owing to the angular configuration of the brackets 52, there is still a second flange arranged at right angles to the flange 54. This flange has been assigned the reference numeral 60.

Although the vertical flange 54 of each bracket 52 confronts the replaceable guide board 50, the flange 60 belonging to each bracket 52 provides support in each instance for what will be termed a work clamp designated generally by the reference numeral 64. From FIG. 6, and also from FIG. 5, it will be perceived that each work clamp 64 includes a pressure strip 66 (actually two strips slightly spaced; see FIG. 1) pivotally connected to the supporting flange 60 by means of a pivot pin 68. The clamp 64 in each instance further includes a reaction link 70 (actually two) plus a handle or lever 72, the handle or lever being articulatively connected to the pressure strip 66 and the reaction link 70 by pins 74 and 76, respectively. A clamping bolt 78 is mounted in a sleeve 79 attached to the free end of the pressure strip 66, the clamping bolt 78 having a presser foot 80 (actually the head of the bolt). The clamping bolt 78 is adjustable by virtue of its threaded engagement by upper and lower lock nuts 82, 83, respectively.

At this time, it will be appreciated that various types of stock or work can be handled or processed on the table 10. Solely for the sake of illustration, the stock or work labeled 84 is in the form of a rectangular board or plate. More will be said hereinafter concerning some of the various routing operations that can be performed on the stock or work 84.

It has already been explained that the horizontal flanges 16b and 18b reside in the plane containing the lower edges of the various integral flanges 12a – 14d. Use is made of the horizontal flanges 16b and 18b for supporting two transverse angle members 86 composed of a horizontal flange 88 and a vertical flange 90 in each instance. Bolts 92 (FIG. 4) connect the horizontal flanges 88 to the flanges 16b and 18b. From FIGS. 1 and 4 it will be perceived that the transverse angle members 86 project both forwardly and rearwardly beyond the panels 12 and 14.

From FIGS. 2 and 10 it is learned that the projecting ends of the transverse angle members 86 support upstanding end plates 94, there being a horizontal flange 96 at the bottom of each of these end plates 94 that allow attachment to the horizontal flanges 88 of the members 86 through the agency of bolts 98.

Although perhaps not too apparent at the moment, nonetheless it can be pointed out at this stage of the description that spacing blocks or shims (not shown) can be inserted between the bottom horizontal flange 96 of the two end plates 94 and the horizontal flanges 88 of the two transverse angle members 86. By so doing, the end plates 94 can be raised to whatever extent is needed for the accommodation of thicker stock. For example, the clearance available for the stock can be increased from 1¾ inches to 2½ inches by adding spacers totaling three-fourths inch.

It will be noted that a pair of holes are initially formed at 100 in the end plates 94 at an elevated position as can be observed in both FIGS. 2 and 3. These holes 100 receive therein a pair of tubular rails 102, the rails 102 being welded at 104 to the circumjacent material of the end plates 94. Not only are the rails 102 at a location above the level of the panels 12 and 14, but as can be seen from FIG. 1 the rails 102 are disposed to either side of the slot 22.

The rails 102 function as a track for a carriage indicated generally by the reference numeral 110. More specifically, especially as can be observed from FIG. 8, the carriage 110 comprises two channel members 112, there being one underlying each rail 102. The channel members 112 are formed with spaced side walls 114 and a connecting web 115. Also, from FIG. 8 (and also from FIGS. 1, 9, 11 and 12) it will be noted that there are two inverted U-shaped members 116 associated with each channel member 112. Actually, the web 115 of the channel members 112 contains holes at 118 so as to accommodate the lower ends of the U-shaped members 116. These ends are threaded and have thereon underlying nuts 120 and overlying nuts 121.

A number of ring bearings 122 loosely encircle the various U-shaped members 116, these ring bearings being composed of nylon and graphite which afford excellent inherent lubrication so that the bearings 122, or at least those contacting the rails 102, roll or glide along the rails 102 with little resistance to provide virtual frictionalless movement.

The carriage 110 further includes a platform 124 having upstanding side walls 126. FIGS. 6, 8, 9 and 12 collectively show that there are two U-shaped suspension arms 128 and 129 for the platform 124. There are upper pivot pins 130 in the form of long bolts or shafts that connect the upper portions of the suspension arms 128 to the inner side walls 114 belonging to the previously mentioned channel members 112. Somewhat similarly, there are four lower pivot pins 132, in the form of short bolts, that serve to connect the lower ends of the suspension arms 128 to the upstanding side walls 126 belonging to the platform 124. There is a handle or lever 134 integral with the arm 128 so that the platform 124 can be shifted upwardly and downwardly, that is toward and away from the slot 22 provided between the two flat panels 12, 14.

While the carriage 110 is intended to be freely movable along the track provided by the rails 102 when pushed by the U-shaped handle 136 (a self-tapping screw 137 extends through each of the lower ends of the handle 136 into the channel members 112 to maintain the handle 136 erect), there will be routing operations to be performed, as will hereinafter become evident, where the carriage 110 should be stationary. Therefore, in order to hold the carriage 110 in a fixed relationship when needed, a carriage clamp indicated generally by the reference numeral 138 is included. FIG. 10 best shows the clamp 138. From the particular view it will be observed that the clamp 138 is comprised of a pair of spaced posts 140 in the form of inverted bolts having heads 149, one post being located at one side of the particular rail 102 appearing in FIG. 10 and the other post to the other side of this particular rail. A coil spring 142 encircles each of the posts and normally biases upwardly a clamping strip 144, the clamping strip having holes 146 near each end thereof through which the upper ends of the posts 140 project. A nut 148 is threaded onto the upper end of one of the posts 140 and a knob 150 is threaded onto the upper end of the other post 140. The lower ends of the posts 140 are anchored to the particular channel member 112, this being by reason of holes in the web 115 and overlying nuts 152 threadedly carried on these posts 140 which nuts pull an underlying strip 154 upwardly against the lower side of the web 115 by reason of the integral heads 149.

A pair of nylon buttons 156 are longitudinally spaced in a central fashion on each web 115. These buttons 156 normally ride smoothly on the underside of each rail 102. On the other hand, as far as the clamp 138 is concerned, it will be understood that when the knob 150 is tightened to force the clamping strip 144 downwardly, the buttons 156 on the web 115 belonging to the channel member 112 with which the clamp 138 is associated simply produce a reactive force in a clamping direction. Thus, the strip 144, due to the fact that it is being forced downwardly against the top of the particular rail 102 simply causes the buttons 156 to bear tightly against the rail 102. In this way, the entire carriage 110 is prevented from any inadvertent movement when the clamp 138 is tightened through the agency of its knob 150.

Figure 9:
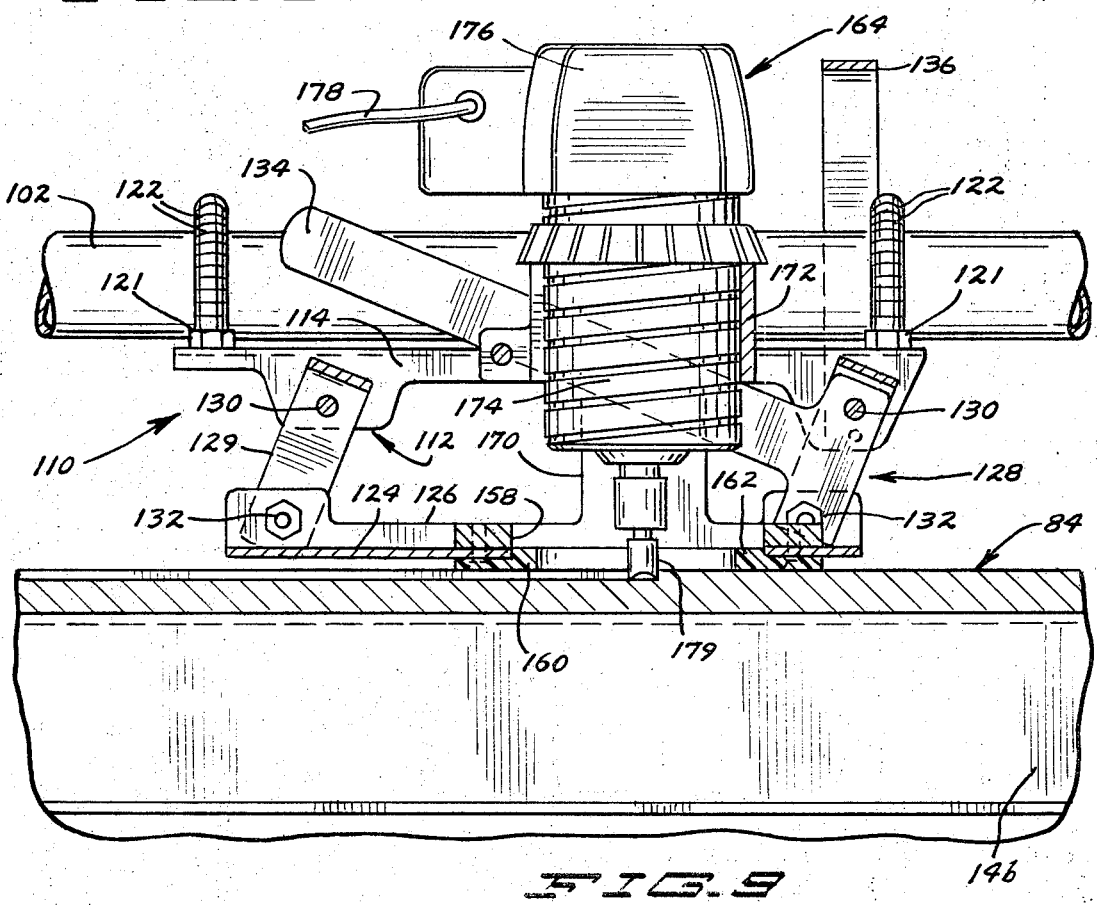
FIG. 9 is a sectional view taken in the direction of line 9—9 of FIG. 8, the view showing additional details of the carriage and the manner in which the router is mounted thereon.

As can perhaps be best understood from FIG. 9, the platform 124 has a circular opening 158 therein. A rabbeted ring plate 160 underlies the platform 124 circumjecent the opening 158, a shoulder portion 162 of the plate 160 projecting upwardly into the opening 158.

Having presented the foregoing information, it is thought that it will be recognized that the platform 124 is intended to support the motor-driven router which has been labeled generally by the reference numeral 164. The unit 164 includes a base 166 which rests on the platform 124. By means of screws or bolts 168 which project through both the underlying ring plate 160 and the base 166 the unit 164 is held fast to the platform 124.

Although the router or unit 164 is of conventional construction, nonetheless it is believed helpful to further describe its typical construction. Therefore, it will be observed that there are upstanding integral leg portions 170, diametrically spaced with respect to each other, which have a cylindrical body 172 encircling the housing 174. Surmounting the housing 174 is an electric drive motor 176, there being an electrical cord 178. Extending downwardly from the motor 176 through the housing 174 is a shaft having a cutter 179 attached to its lower end. The router depth, that is the distance the cutter 179 extends beneath the ring plate 160, is determined or set through a screw adjustment (not illustrated).

As best viewed in FIG. 3, a cord support 180 has lower ends 182 configured so as to fit snugly and resiliently within the rear ends of the tubular rails 102. At the upper end of the cord support 180 are resilient convolutions 184 which can be spread apart to receive therein a section of the cord 178. In this way, the cord 178 is held in a manner such as little or no interference is experienced when the carriage 110, together with the router unit 164 mounted thereon, is moved along the rails 102.

OPERATION

Although the manner in which my routing fixture or table 10 is used should be readily understood from the foregoing descriptive information, nonetheless a brief review thereof should be of assistance in appreciating the benefits to be derived. Therefore, it will be assumed that the work or stock to be routed, this having been designated by the reference numeral 84, is first held stationary by means of the several work clamps 64. It will be appreciated that the handles or levers 72 belonging to these clamps 64 need only be manually grasped and pulled to the right from the position depicted in FIG. 6 to that illustrated in FIG. 5. This action causes the foot 80 to bear tightly against the upper surface of the stock or work 84 in each instance.

With the work or stock 84 clamped as described immediately above, then a cross cutting operation can be performed. With the router 164 secured to the platform 124 by means of the bolts 168, then all that the worker need do is to move the handle 134 downwardly so as to cause the platform 124 to swing downwardly. Owing to the fact that the router 164 is mounted on the platform 124, the cutter 179 is moved downwardly at the same time. If a linear groove is to be formed and is to start at the rear of the work 84, then the carriage 110 would obviously be initially placed at the rear of the table 10. In other words, the carriage would not be in the position shown in FIG. 1 but would be at the rear of the table which corresponds more closely to the position illustrated in FIGS. 11 and 12.

Having started the groove, which will be given the reference numeral 186, at the rear of the clamped work 84, then the carriage 110 is slid in a direction toward the front of the table 10, this being in the direction of the arrow 188 applied to FIG. 1. Notches 187 in the platform help considerably in the initial positioning of the carriage 110 and the subsequent movement thereof, for these notches 187 are located so as to be in alignment with the cutter 179. Continued advancement toward the front of the table will result in the groove 186 being formed so that it extends completely from the rear edge of the work 84 to the front edge thereof and at a uniform or constant depth. The depth of the groove 186 is not intended to extend completely through the work or stock 84. However, even when performing routing operations on relatively thin stock, it will be appreciated that the cutter 179 is never damaged by any portion of the table 10, for the panels 12, 14 thereof are spaced sufficiently to form the slot 22. Thus, the cutter 179 is always aligned with the slot 22 and cannot cut into any portion of the table 10.

Perhaps at this stage of the operational description it will be well to once again refer to the spacers or shims that can be placed intermediate the flanges 88 of the angle members 86 and the flanges 96 at the bottom of the end plates 94. It is to be pointed out that no shims have actually been pictured, but the addition of such members will raise the end plates 94, and since the carriage 110 is slidably disposed on the rails 102, the carriage 110 will be raised a corresponding amount. This in turn will elevate to a greater degree the cutter 179, for it will be remembered that the router 164 is mounted on the platform 124. In other words, when a relatively large number of spacing blocks or shims are added, then thicker stock or work can be accommodated than that illustrated, which has been assigned the reference numeral 84.

Referring now to FIGS. 11 and 12, it will be assumed that the work clamps 64 have now been released, that is, the respective handles 72 actuated from the position depicted in FIG. 5 to the position pictured in FIG. 6. Also, it will be assumed that the carriage clamp 138 has been tightened after the carriage 110 has been moved to the rear of the table 10. In other words, the fixture is now being readied so as to make a rip cut with the router 164. To perform this routing operation, after the carriage 110 has been clamped in a fixed relationship by reason of the clamp 138, it being only necessary to rotate the knob 150 to cause the clamping strip 144 to be urged downwardly against the top of the particular rail appearing in FIG. 10, then the now free-to-be-moved work 84 is manually pushed or advanced over the panels 12 and 14. This advancement is with one work edge moving along the guide board 50. Owing to the fact that the router 164, being mounted on the platform 124, is held stationary, a groove 190 is formed along the rear edge of the work 84, the work being moved in the direction of the arrow 192 applied to FIG. 11.

It will be appreciated that work of a repetitious or duplicate character can readily be handled by simply substituting new work 84 for the job that has been completed. Yet, the table 10 lends itself readily to custom routing operations where one is concerned with different groove patterns for each piece of work.

Having explained initially the manner in which the table 10 is held together by virtue of the few bolts 20 and 26, it is not believed necessary to review the manner in which the table 10 is initially assembled. It should be understood, however, that the parts can be shipped from the factory in a disassembled condition and the purchaser can easily use the bolts 20 and 26 to assemble the table after he receives it. Of course, when the table 10 is to be disassembled again, the user can readily do so and store it in its knocked down condition until needed. However, it is contemplated that once the table 10 has been assembled and used it will usually be left in this assembled condition; it is just that the invention makes it such that the user has the option of readily disassembling the table should circumstances so dictate.

I claim:

1. A routing fixture comprising a pair of panels, means retaining said panels in a planar relation with a slot therebetween, track means extending parallel to said slot, and carriage means for mounting a router for movement along said track means and longitudinally of said slot, said carriage means including a platform shiftable toward and away from said slot in a direction perpendicular to the plane of said panels so that a router mounted on said platform is also shiftable toward and away from said slot as well as movable longitudinally of said slot.

2. The routing fixture defined in claim 1 including transverse means fixedly connected to said panels adjacent the sides thereof opposite said track means and extending parallel to said slot, said transverse means projecting beyond the edges of said panels, and means disposed on the projecting ends of said transverse means for supporting said track means in a spaced relationship with said panels.

3. The routing fixture defined in claim 2 in which said track means includes a pair of tubular rails, one to either side of said slot, and a pair of U-shaped members slidable along each rail, the ends of said U-shaped members being attached to said carriage means for guiding said carriage means longitudinally of said slot.

4. The routing fixture defined in claim 3 in which said carriage means includes a channel member associated with each rail, the ends of two of said U-shaped members being attached to one channel member and the ends of the other two U-shaped members being attached to the other channel member, said carriage means further including means interconnecting said channel members and said platform for permitting said shifting of said platform toward and away from said slot in said perpendicular plane.

5. The routing fixture defined in claim 4 in which said shifting means includes a plurality of arm elements pivotally connected to said channel members and to said platform.

6. The routing fixture defined in claim 5 including a lever projecting from one of said arm elements for enabling said platform to be manually shifted toward and away from said slot in said perpendicular plane.

7. The routing fixture defined in claim 4 including a pair of button bearings mounted on each channel member, a plurality of ring bearings encircling each U-shaped member, the ends of said U-shaped members being threaded, and a nut on each threaded end, whereby sufficient tightening of said nuts causes said button and ring bearings to slidably bear against said rails.

8. The routing fixture defined in claim 7 including means for clamping said carriage means to prevent inadvertent longitudinal movement thereof.

9. The routing fixture defined in claim 8 in which said clamping means includes a pair of spaced posts projecting from one of said channel members, one of said posts being located at one side of one of said rails and the other of said posts to the other side thereof, a coil spring encircling each post, a clamping strip having holes in its ends for accommodating the projecting ends of said posts, said projecting post ends being threaded, and a threaded member carried on each of said projecting threaded ends, whereby tightening of one of said threaded members forces said clamping strip against said one rail to prevent said longitudinal movement of said carriage means.

10. The routing fixture defined in claim 9 in which said one threaded member constitutes a knob.

11. The routing fixture defined in claim 8 including means for clamping the work to be routed against said panels.

12. The routing fixture defined in claim 11 in which said work clamping means includes a pressure strip pivotally mounted intermediate its ends on a first fixed axis with respect to said panels, a presser foot attached to one end of said pressure strip for engaging said work, a lever pivotally connected intermediate its ends to the other end of said pressure strip, said lever having a handle portion at one end, and a reaction link pivotally connected at one end to the other end of said lever and pivotally mounted at its other end on a second fixed axis spaced from said first fixed axis.

13. A routing fixture comprising a pair of panels having perpendicular marginal flanges at their opposite ends, means retaining said panels in a planar relation with a slot therebetween including an angle member at each end of said panels having a first flange attached to the end flanges on said panels in each instance, said first flanges being in the respective planes of said end flanges and extending from the ends of said slot perpendicularly with respect to the axis thereof, track means extending parallel to said slot, and carriage means for mounting a router for movement along said track means and longitudinally of said slot.

14. The routing fixture defined in claim 13 in which each angle member has a second flange residing in a plane parallel to said panels which plane contains the edges of said panel flanges, and a pair of transverse angle members each having a first flange fixedly connected to the second flanges of said first-mentioned angle members at laterally spaced locations to either side of the ends of said slot, said transverse angle members projecting beyond the second flanges of said first-mentioned angle members, and respective means attached to the projecting ends of said transverse angle members for supporting said track means in spaced relation with said panels.

15. The routing fixture defined in claim 14 in which said track supporting means includes a plate having a flange attached to the projecting ends of the first flanges of said transverse angle members, the opposite ends of said track means being secured to said plates in a spaced relationship with said panels.

16. A routing fixture comprising a pair of panels, means retaining said panels in a planar relation with a slot therebetween, each panel having a pair of edges extending parallel to the direction of said slot, a perpendicularly disposed flange extending along each of said edges and projecting from the sides of said panels opposite said track means, the two flanges nearer said slot having first and second pairs of holes and the flanges farther from said slot each having at least one pair of holes aligned with said first pair of holes in one instance and said second pair of holes in the other instance, said farther flanges being parallel to each other and to said nearer flanges, first and second pairs of extension rods slidably received in said holes and projecting laterally in opposite directions from said panels, means retaining said panels in a planar relation with a slot therebetween, track means extending parallel to said slots, and carriage means for mounting a router for movement along said track means and longitudinally of said slots.

17. The routing fixture defined in claim 16 including a supporting foot mounted on the projecting ends of each pair of rods.

18. The routing fixture defined in claim 17 including an adjustable stop on one projecting end of one rod of each pair of rods.

19. The routing fixture defined in claim 17 including a pair of tubular guides attached to each of said flanges residing farther from said slot, one pair of said rods extending through one pair of said guides and the other pair of said rods extending through the other pair of said guides.

20. A routing fixture comprising a pair of panels, means retaining said panels in a horizontal plane with a slot therebetween, track means extending parallel to said slot at an elevation thereabove, and carriage means for shiftably mounting a router for movement in a vertical plane above the plane of said panels and toward and away from said slot and for longitudinal movement along said track means in a parallel relationship to said slot, whereby the router is movable both vertically and longitudinally.

* * * * *